Figure 12:
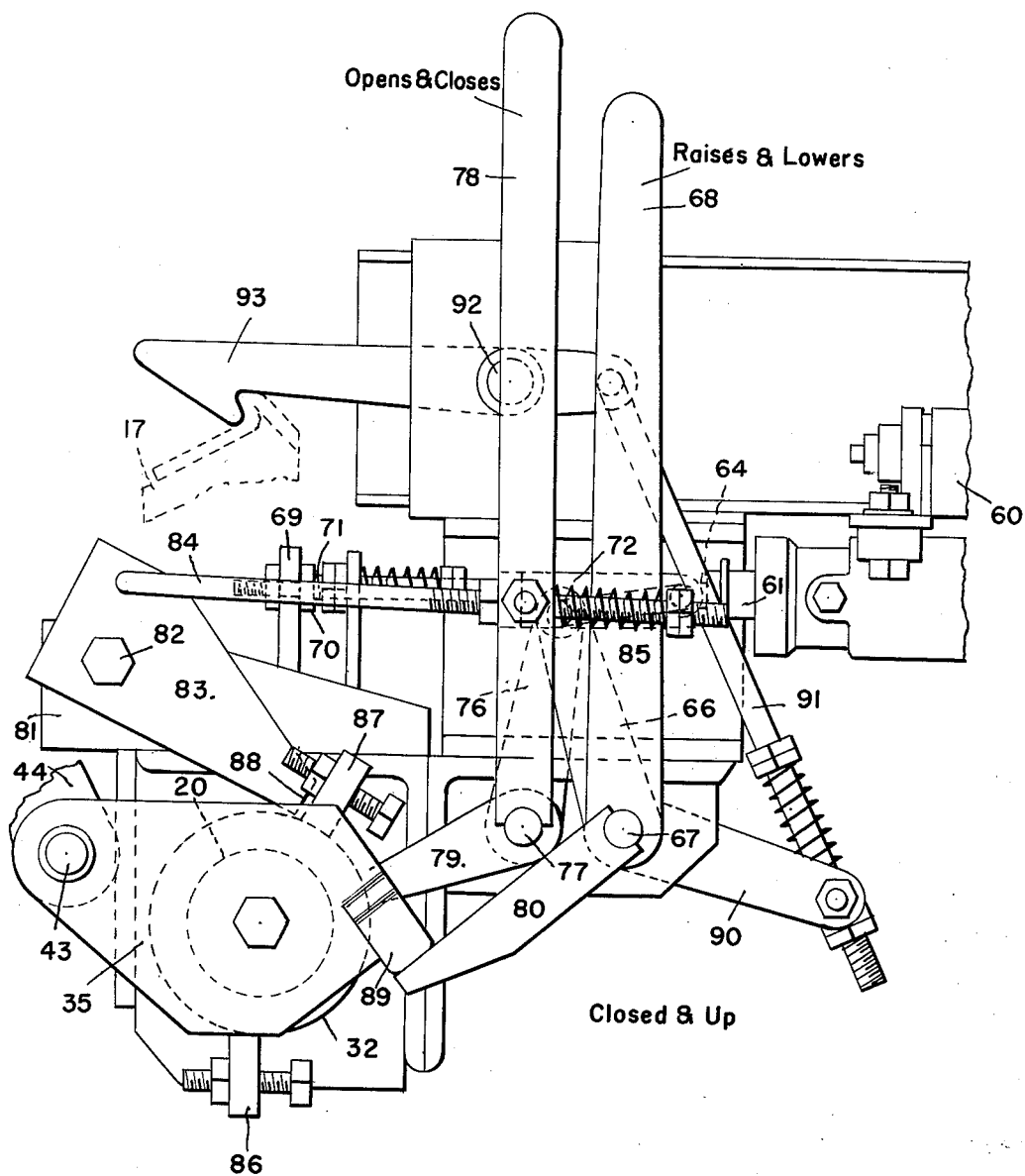

May 14, 1957 L. S. WOOD 2,792,135
POWER-OPERATED TAIL GATE
Filed Jan. 12, 1955 5 Sheets-Sheet 1
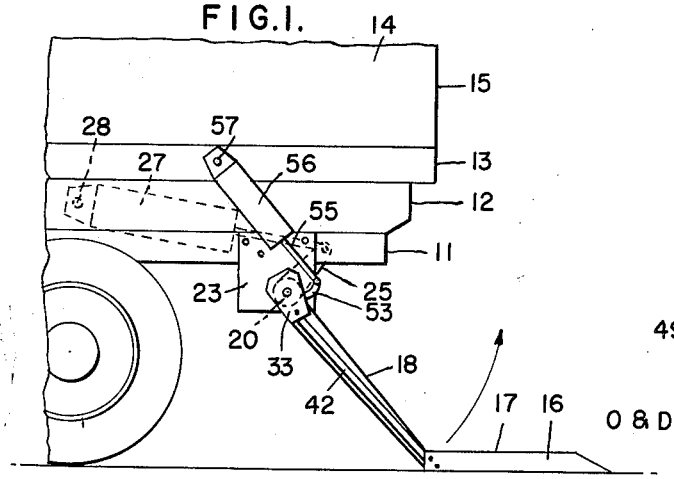
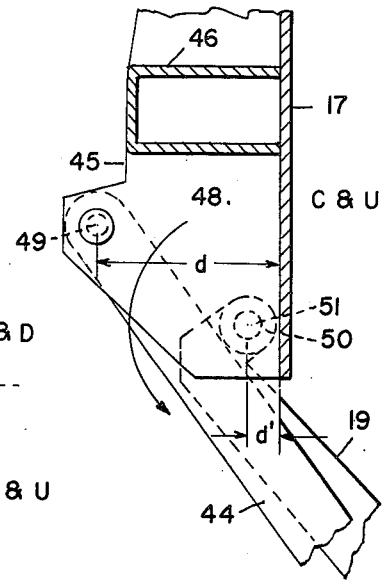
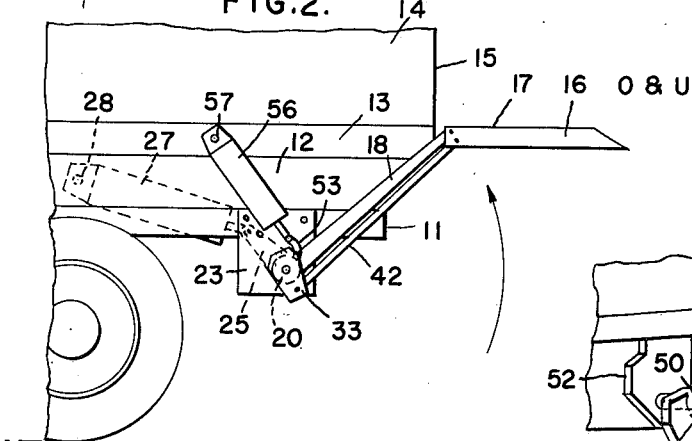
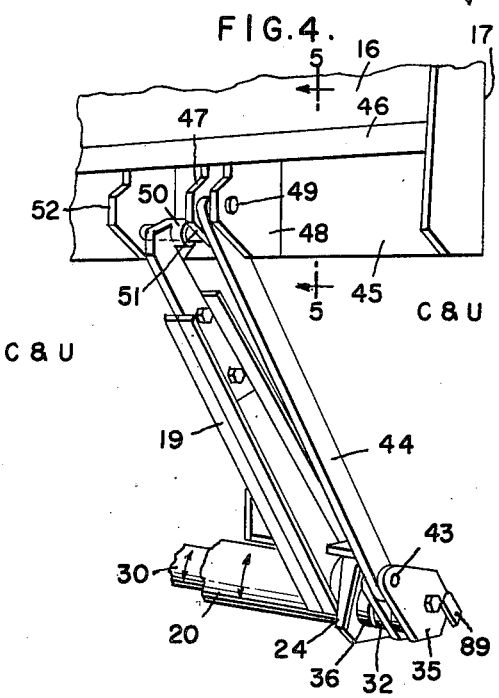
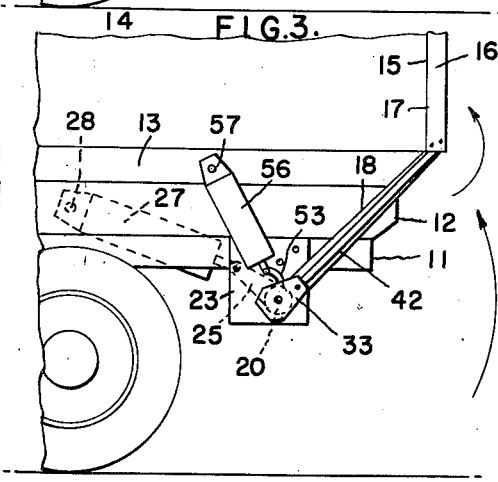
Inventor
Louis S. Wood
By Arthur Middleton
ATTY.

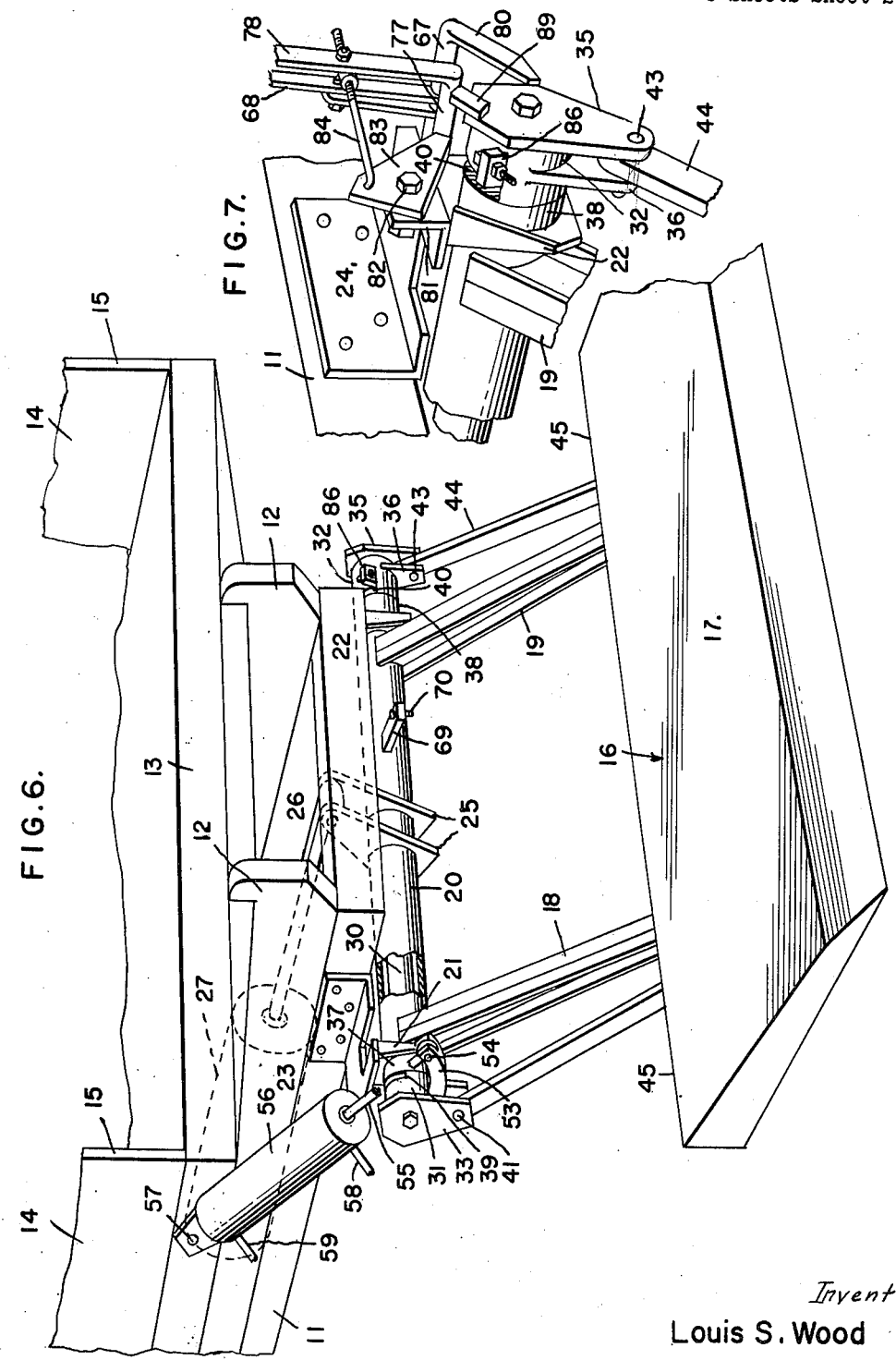

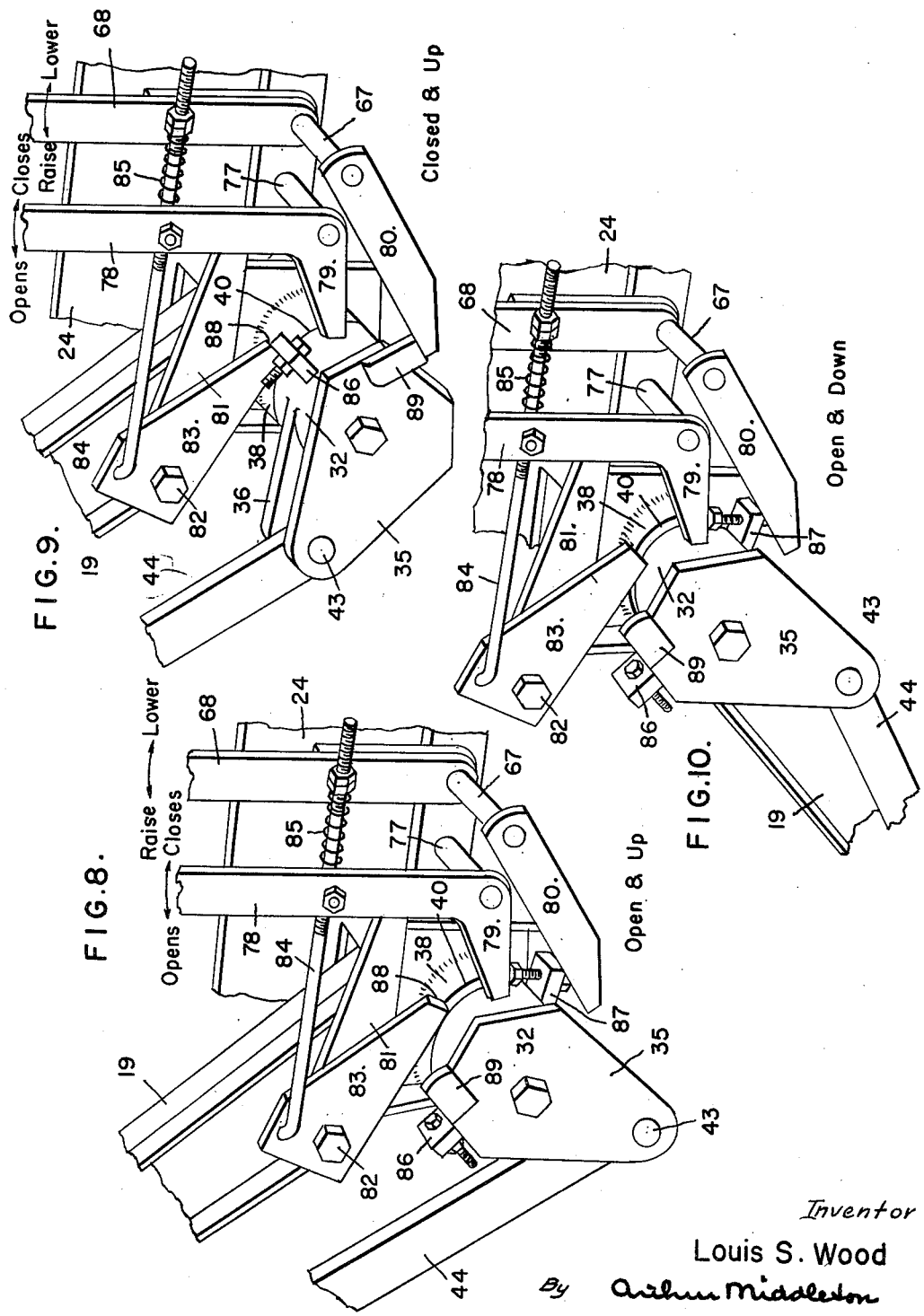

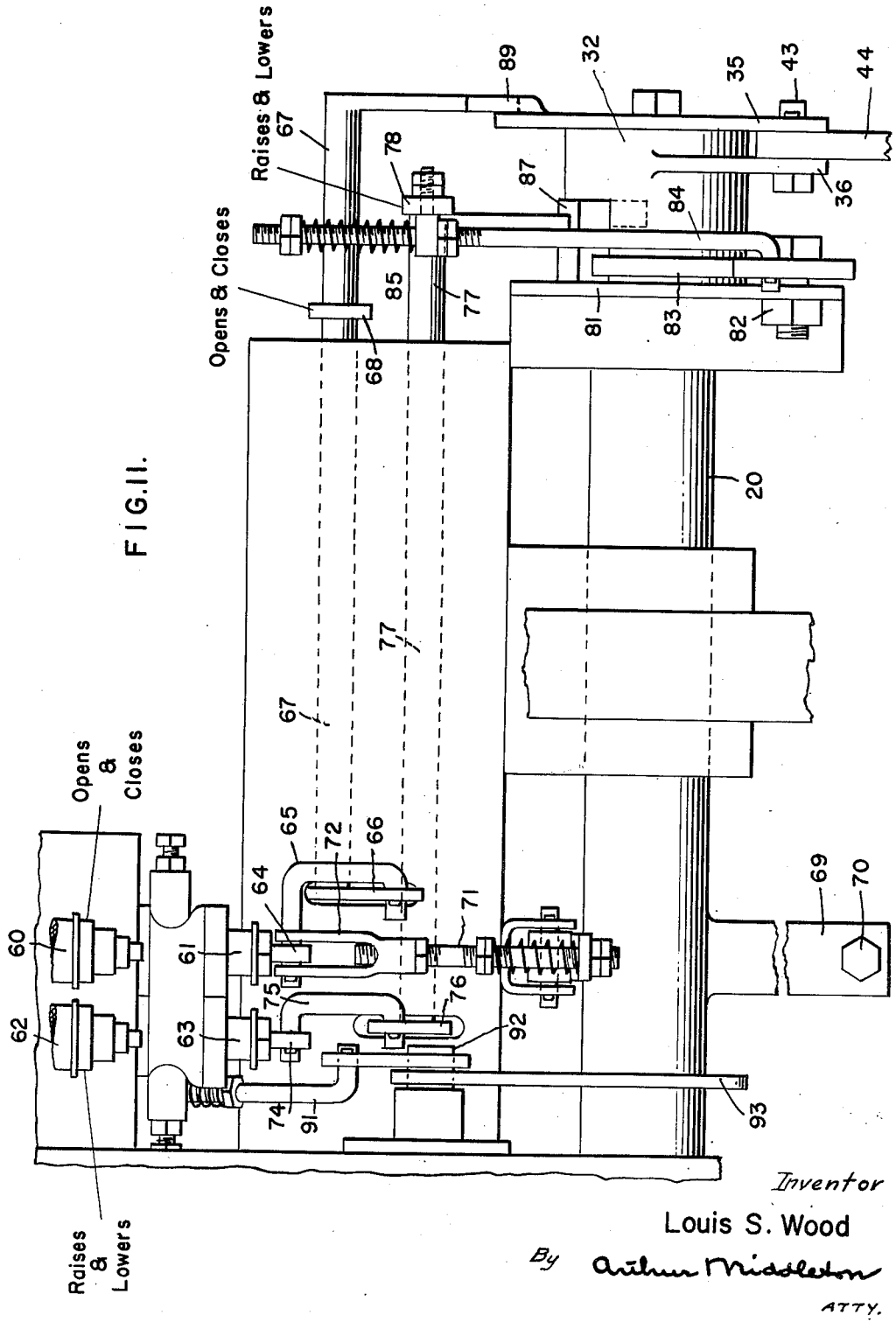

United States Patent Office 2,792,135
Patented May 14, 1957

2,792,135

POWER-OPERATED TAIL GATE

Louis S. Wood, Findlay, Ohio, assignor to L. A. Young Spring & Wire Corporation, Detroit, Mich., a corporation of Michigan Application January 12, 1955, Serial No. 481,447

8 Claims. (Cl. 214—77)

This invention relates to power-operated tailgates for trucks. One of the early patents on such tailgates is the patent to Wood, No. 2,469,321, of May 3, 1949, which shows a tailgate that can be pivotally moved from body-closing position or up position, to horizontal or open position that is parallel to the floor of the truck body. Next, the tailgate while in this horizontal open position is lowerable to the ground, and subsequently raisable back to the truck floor level position, whereupon the tailgate is closeable. In this Wood patent, movement of the tailgate pivotally from open position to closed position is accomplished by means of an endless chain. This endless chain arrangement was then improved upon in a manner wherein two radius rods were substituted for each chain, as shown in the patent to Wood No. 2,683,545 of July 13, 1954. So this invention is directed to improvements over the apparatus of the latter patent, by the substitution of only one radius rod for the pair of rods shown in that patent. Therefore, an object of this invention may be said to comprise the devising of ways and means whereby one radius rod can be used instead of a pair of rods, in the environment just described. Another object is to devise a construction and arrangement of parts whereby such a tailgate assembly is made more dependable, more durable, and cheaper to construct.

The environment of the invention may be described as a paltform tailgate and its operating mechanism for a truck provided with a hydraulic system including a tailgate-opening and -closing piston-bearing cylinder and a tailgate-lowering and -raising piston-bearing cylinder, an outer hollow rockable shaft supported from the truck and having fixed to the shaft lowering and raising arms pivoted to the tailgate, and an inner rockable shaft projecting through the outer shaft having enlarged ends. The novel features of the operating mechanism include an end plate on each enlarged end of the inner rockable shaft, one radius rod pivotally extending between an off-center point on each end plate and a point supported from the forward edge of the platform lying at an elevation above and forward of the point where the arms are pivoted to the platform, lever-bearing means for controlling the motivation of the opening and closing cylinder, and lever-bearing means for initiating motivation of the lowering and raising cylinder. Other advantageous details of construction will appear as this description proceeds.

As this invention may be embodied in several forms without departing from the spirit and scope or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly equivalents, are therefore intended to be embraced by those claims.

The invention is illustrated in the accompanying drawings in which Fig. 1 is a diagrammatic view showing a truck with the tailgate apparatus in open and down positioned; Fig. 2, in open and raised position; and Fig. 3 in up and closed position. Fig. 4 shows a detail with parts in section. Fig. 5 is an isometric view of parts including the lifting arm 19 and the opening and closing radius rod 44, and particularly how they are secured to the tailgate platform. Fig. 6 shows an isometric view of the tailgate assembly looking forwardly from the rear of the truck. Fig. 7 shows essential parts of the operating mechanism with the tailgate open and down. Fig. 8 is a view like that of Fig. 7 except that the tailgate is open and up. Fig. 9 is like the foregoing two views except that the tailgate is closed and up. Fig. 10 is another similar view except that the tailgate is open and down. Fig. 11 is a partial plan view showing the connections between the operating hand-levers and the control details of the hydraulic system. Fig. 12 is a side elevation of the hand-levers and their environment.

In Figs. 1, 2 and 3, a truck chassis 11, supports a body frame 12, having a floor 13, and sides 14. The frame has an open end 15, with which is associated an openable and closeable tailgate 16 having a body-abutting side or face that is in effect a platform 17. The tailgate 16 is capable of being power-moved to and from three main positions, named open and down, hereinafter referred to as O & D, shown in Fig. 1; open and up, O & U, shown in Fig. 2; and closed and up, C & U, shown in Fig. 3. These letters appear in various figures because in looking at the figures, it is important to know the position that is occupied by the tailgate.

The means by which the tailgate 16 is lowerable and raisable, from the position O & D of Fig. 1 to the position O & U of Fig. 2, and vice versa, includes two companion tailgate-lifting arms 18 and 19 fixed to an outer hollow rockable shaft 20 rockably supported by means of journal boxes 21 and 22 depending from the chassis 11, from brackets 23 and 24. This outer shaft has a crank arm 25, having a piston-rod 26 connected with a tailgate-lifting (lowering and raising) piston-bearing cylinder 27, pivotally mounted at 28 on the body frame 12. This tailgate raising and lowering piston-bearing cylinder is in a hydraulic circuit described later. Rockably mounted within the outer hollow rockable shaft 20 is an inner hollow rockable shaft 30 that is longer than the outer shaft and projects therethrough, as shown in Fig. 6, and bears enlarged ends 31 and 32. Enlarged end 31 terminates in an end plate 33, preferably more or less keystone in shape, and just inboard thereof is a lug 34 forming with the end plate a crank. Enlarged end 32, terminates similarly in an end plate 35 and lug 36 forming a crank. Journal boxes 21 and 22 respectively have an enlarged journal 37 and 38, each with a cammed face 39 and 40 respectively.

Pivotally secured by crank pin 41 between the end plate 33 and its adjacent lug 34, that jointly form a crank, is a radius rod 42. Similarly secured by off-center crank pin 43 between the end plate 35 and its adjacent lug 36, that jointly form a crank, is a companion radius rod 44. Radius rods 42 and 44 and tailgate-lifting arms 18 and 19 are pivotally connected to the bottom forward edge 45 of the tailgate as follows (Figs. 4 and 5): At the forward edge 45 of the tailgate on the underside of the platform 17, is a channel-bar 46 extending lengthwise of the platform (transversely of the truck) welded to which and to the underside of the platform are two adjacent lugs 47 and 48 having lug-like extensions between which extends a pivot pin 49 on which the tailgate end of the radius rod 44 is pivoted. This arrangement is important because the pivot pin 49 must be located a significantly greater distance d (in Fig. 5) than distance d', later described. The upper end, or tailgate-supporting end of the lifting arm 19 that is fixed to the outer rockable shaft 20, has an upwardly extending laterally directed journal 50 pivotally supported from a stub shaft 51, that in turn is held between lug 47 and a corresponding adjacent lug 52. The center of stub shaft 51 is the distance $d'$ from the platform (Fig. 5) and it must be much less than the distance $d$ because the tailgate platform 17 must be swung about 51 as a pivot by longitudinal motion of the radius rod 44. Radius rod 42, being similar to radius rod 44, is pivotally attached to the tailgate platform 17 in the same manner, and also tailgate lifting arm 20 is pivoted to the tailgate platform 17 in the same manner as its companion arm 19.

Reverting for the moment to the inner rockable shaft 30, with its enlarged end 31 (Fig. 6), that end has fixed thereto a curved arm 53, to which is pivoted at 54, to a piston-rod 55, connected to a tailgate opening and closing piston-bearing cylinder 56, that is pivotally supported at 57. Cylinder 56 is connected by pipes 58 and 59 in a pump-operated hydraulic circuit with piston-bearing cylinder 60 regulated by a spool-valve construction 61. This cylinder and its spool valve is shown in detail in the patent application of Wood, Ser. No. 381,421, filed September 21, 1953, but forms no part of this invention. In a similar manner, raising and lowering cylinder 27 is connected in a similar hydraulic circuit with a piston-bearing cylinder 62 regulated by a spool-valve construction 63. Spool valve 61 has a stem 64 openable or extendable by a bent finger 65 operated from an arm 66 on a rockable shaft 67 having a hand-lever 68 that controls the opening of the tailgate. The spool valve stem 64 is returned to starting position (with the tailgate closed as in Fig. 3) as a result of clockwise rotation of the outer rockable shaft 20, when its laterally projecting finger 69, having an adjusting screw 70, contacts with spring-loaded rod 71 terminating in a yoke 72, that is connected to the stem 64.

Raising and lowering spool valve 63 has a stem 74 reciprocated by a bent finger 75 from an arm 76 on a rockable shaft 77 having a hand lever 78, terminating in a tapered arm 79. 80 indicates a somewhat similar arm of shaft 67. Supported on the plate 24 from which depends the journal box 22 (Figs. 7–10) is a bracket 81 to which is pivoted at 82, a pawl 83, shaped as shown, having at its upper section above its pivot 82, a link-rod 84, connected to opening and closing hand lever 78 in a spring-loaded manner as shown generally at 85.

On the enlarged end 32 on the inner rockable shaft 30, are two nut-bearing stop members 86 and 87 (Figs. 7–10), of which the latter is for engagement with the arm 80 on the raising and lowering lever 68 (Figs. 8 and 10), while the other is for engagement in a clockwise direction with arm 79 on opening and closing lever 78 and in a counterclockwise direction with the small end 88 of the pawl 83 (Fig. 9). 89 represents a stop extending from the end plate 35, adapted to engage arm 80 on raising and lowering lever 68. In Fig. 12, it can be seen that the shaft 67 for the raising and lowering lever 68 has an arm 90 operating a spring-load rod 91 that tilts a shaft 92 carrying a rockable latch 93 whose function is to latch the tailgate when in open but up position as shown in Fig. 2. A slight motion of the lever 68 to the right (Fig. 12) unhooks the latch, but the latch is self-locking due to the spring-load normally thereon.

Passing now to the essential operation of the parts: for opening the tailgate platform from its position closed and up as shown in Fig. 3, one pushes the hand lever 78 to the left to raise pawl 83 to clear spring-loaded stop nut 85 (Fig. 9) and rotate shaft 77, the movement of whose arm 66 moves bent finger 65, which in turn operates the spool valve stem 64, to force oil pressure into the tailgate closing and opening cylinder 56 (Fig. 6) at the rear of the cylinder forcing the piston-rod 55 out of the cylinder and by connecting curved arm 53 attached to the enlarged end 31 on the inner rockable shaft 30, causes rotation of the shaft 30 and its enlarged end 31 that carries the end plate 33 as well as its opposite enlarged end 32 that carries the other end plate 35. This motion pulls radius rod 42 downwardly longitudinally of itself as well as radius rod 44 downwardly longitudinally of itself, with the result that the parts move from the position shown in Fig. 9 to that shown in Fig. 8, and from that shown in Fig. 3 to the position shown in Fig. 2. Looking now at Fig. 5, the radius rod 44 moves longitudinally downwardly whereupon the tailgate moves pivotally downwardly as shown by the arrow about the pivot pin 51 that fastens the tailgate lowering and raising arm 19 to the tailgate. The tailgate is moved to open position until it is horizontal and parallel with the floor of the truck body. At this instant (Fig. 8), the stop 87 on the enlarged end 32 of the inner rockable shaft 30, contacts the arm 79 of hand-lever 78 and thus moves its shaft 77, with the arm 76 at the other end thereof, to operate the bent finger 75, to move the spool valve stem 74, into neutral and non-operating position, for closing off pressure flowing to the opening and closing cylinder 56.

Now to close the tailgate to assume position shown in Fig. 3, consider Fig. 8; pushing hand-lever 78 to the right increases tension on the spring in the assembly 85 which tends to force pawl 83 down by pivoting it around its pivot 82. This movement also moves shaft 77 and the arm 76 on its other end, which through bent finger 75 moves spool valve stem 74, causing pressure to enter the front end of the closing and opening cylinder 56, thus pulling in the piston rod 55 and the curved arm 54 on the enlarged end 31 on the inner rockable shaft 30. This movement of the shaft 30 also moves the other enlarged end 32, whereupon both radius rods 42 and 44 are pushed upwardly to move the open tailgate pivotally about its pivots 51, to vertically closed position as the reverse or closing action takes place reversely to the arrow in Fig. 5. At this instant, the stop 86 contact the arm 79 of the hand lever 78 moving its shaft 77 and its arm 76 (Fig. 11) through bent finger 75, to move the spool valve stem 74 to neutral position closing off pressure to cylinder 56, at the same time, pawl 83 drops back of stop 86, preventing the tailgate from drifting down due to leaking of the hydraulic system.

Now for lowering the tailgate platform after the platform is opened: Push hand-lever 68 first slightly to the left for first releasing the latch 93 (Fig. 12) from the platform so the platform can be lowered. This slight movement of the lever 68 rearwardly, through motion of its shaft 67 and arm 90, and through the medium of the spring-loaded rod 91, releases the latch 93 from holding the platform, leaving it free to be moved. Then the hand-lever 68 is pushed to the right. This moves its shaft 67 whose movement moves the arm 66 at its other end which in turn moves the bent finger 65 and that operates the spool valve stem 64, causing the cylinder to force oil pressure into the rear of lowering and raising cylinder 27, pushing its piston rod 26 out causing the crank arms 25 to rotate and thus rotate the outer rockable shaft 20. Rotation of this shaft moves its fixed arms 18 and 19, and the platform, from the position shown in Fig. 2, to Figs. 3, 6 and 7.

Now to raise the platform from its position shown in Fig. 1: Push hand lever 68 to the right (Fig. 10) which moves its shaft 67 and this moves arm 66 at the other end thereof, that in turn moves the bent finger 65 which activates the spool valve stem 64, forcing oil pressure into the front of the lowering and raising cylinder 27, pulling its piston-rod 26 into the cylinder, and thus causing rotation of the crank-arms 25, that rotates the outer rockable shaft 20 with its fixed arms 18 and 19 to lift the platform to the level of the floor, of the truck, namely as shown in Fig. 2. This upward travel of the arms 18 and 19 fixed to the outer shaft 20 is automatically limited by adjustable stop-nut 70 on stop arm 69 carried by the shaft 20, coming into contact with the spring-loaded rod 71 (Fig. 11) which contact moves that rod longitudinally against the spool valve stem 64 that shuts off oil pressure flowing to the lowering and raising cylinder 27. When the tailgate platform is closed, as shown in Fig. 3, the mechanism for raising and lowering the platform is locked through the medium of the stop lug 89 on the end plate 35, as shown in Fig. 9, that precludes raising and lowering hand-lever from being moved to the right.

I claim:

1. In a truck with a wheeled chassis bearing a body and a power-operated tailgate by lever-operated hydraulic means supported from the chassis for pivotally opening and closing the tailgate and by lever-operated hydraulic means supported from the chassis for lowering and raising the tailgate while in horizontal position of which the lowering and raising means include an outer rockable shaft having fixed arms pivotally supporting the tailgate and the opening and closing means include an inner rockable shaft projecting through the hollow shaft bearing enlarged ends, the improvement that comprises pivotal means for securing the arms to the body-abutting side of the tailgate a significant distance from that side inboard therefrom forming the axis about which the tailgate pivots in opening and closing, a crank on each enlarged end, one radius rod pivotally extending from each crank to the tailgate, pivotal means for securing the outer end of each radius rod to body-abutting side of the tailgate at a point farther from the body than where the arms are pivotally secured thereto but at an elevation substantially above that of the arms' securement whereby when the inner shaft and its cranks rock alternately to push the radius arms and to pull them, such pushing and pulling rotating the tailgate pivotally about said axis to open and to close the tailgate respectively.

2. Apparatus according to claim 1, with the addition of stop means supported from at least one of the enlarged ends on the inner rockable shaft which upon rotation of the enlarged end to tailgate-closing position is contactable with the lever for opening and closing the tailgate to move that lever rotationally to tailgate-stopping position with the tailgate in vertical and thus closed position.

3. Apparatus according to claim 1, with the addition of stop means supported from at least one of the enlarged ends on the inner rockable shaft, which upon rotation of that enlarged end to tailgate-opening position is contactable with the lever for lowering and raising to move it into neutral position.

4. Apparatus according to claim 1, with the addition of a plurality of stop means supported from at least one of the enlarged ends of the inner rockable shaft of which one stop means upon rotation of the enlarged end to tailgate-opening position is contactable with the lever for opening and closing the tailgate to move that lever rotationally to tailgate-stopping position with the tailgate in horizontal and open position and while in that position another stop means moves the raising and lowering lever into neutral position.

5. Apparatus according to claim 1, with the addition of means for locking the tailgate-raising and -lowering means when the tailgate is in closed position.

6. A platform tailgate and its operating mechanism for a truck provided with a hydraulic system including a tailgate-opening and -closing piston-bearing cylinder and a tailgate-lowering and -raising piston-bearing cylinder, an outer hollow rockable shaft supported from the truck and having fixed to the shaft lowering and raising arms pivoted to the tailgate, and an inner rockable shaft projecting through the outer shaft having enlarged ends, said mechanism comprising an end plate on each enlarged end of the inner rockable shaft, a sole unitary radius rod pivotally extending between an off-center point on each end plate and a point supported from the forward edge of platform lying at an elevation above and rear of the point where the arms are pivoted to the platform, lever-bearing means for controlling the motivation of the opening and closing cylinder, lever-bearing means for initiating motivation of the lowering and raising cylinder, and means between one end plate and the latter means for locking the latter against operation when the tailgate platform is in closed position.

7. Apparatus according to claim 6, wherein the last means mentioned therein comprises a stop on the one end plate and an arm extending from the lever of the means for controlling the motivation of the opening and closing cylinder which when contacted by the stop is locked against platform-opening movement.

8. Apparatus according to claim 6, with the addition of means extending laterally from the outer rockable shaft which upon a predetermined degree of rotation of that shaft in a platform-raising direction renders inoperative the lowering and raising lever-bearing means further to raise the platform.

References Cited in the file of this patent

UNITED STATES PATENTS

| | | |
|---|---|---|
| 2,626,067 | Berford et al. | Jan. 20, 1953 |
| 2,654,491 | Duis et al. | Oct. 6, 1953 |
| 2,683,539 | Corley | July 13, 1954 |
| 2,683,545 | Wood | July 13, 1954 |
| 2,684,770 | Park | July 27, 1954 |